Figure 1:
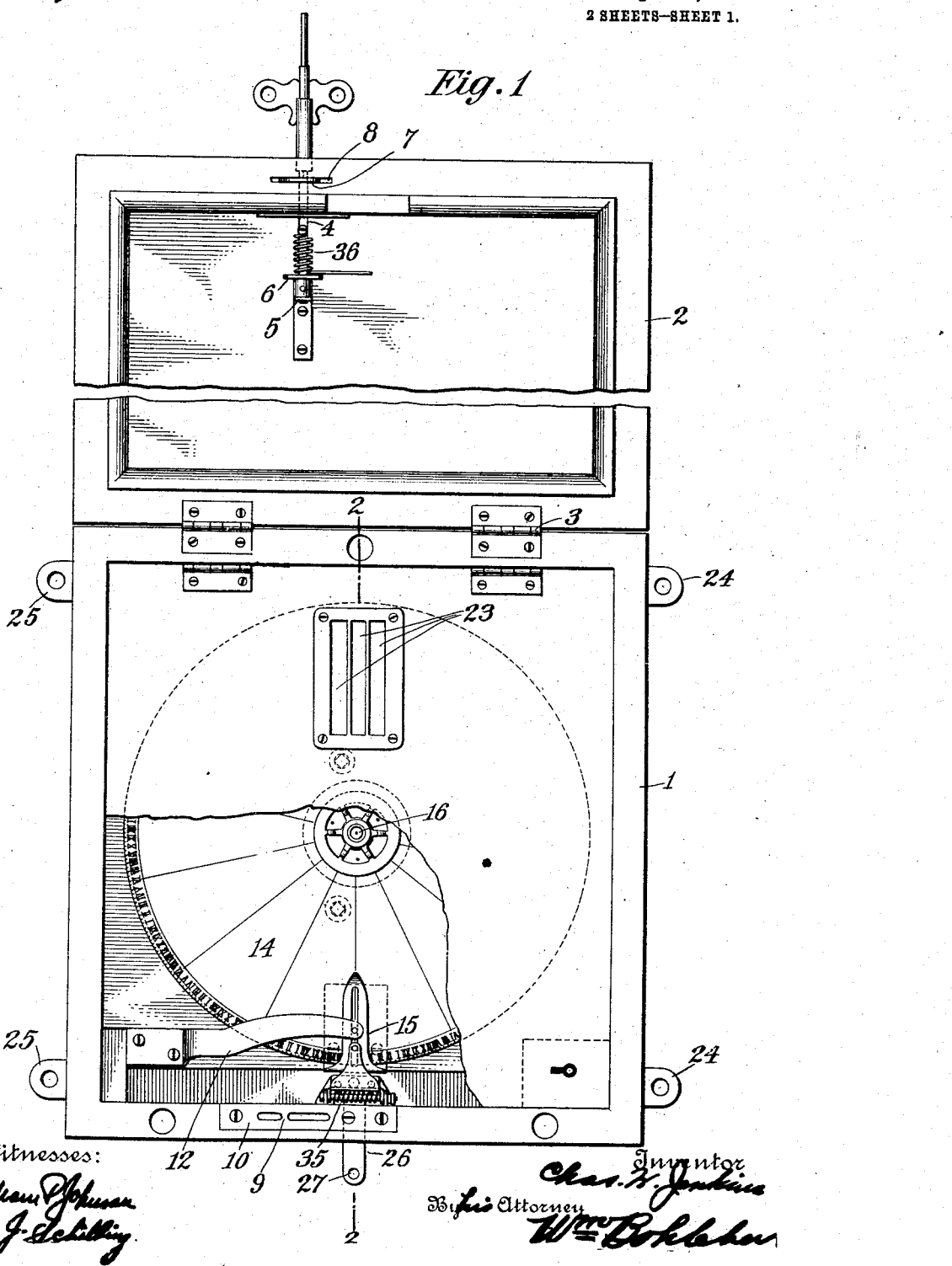

C. H. JENKINS.
WATCHMAN'S TIME REGISTER.
APPLICATION FILED JAN. 13, 1912.

1,135,529.

Patented Apr. 13, 1915.
2 SHEETS—SHEET 1.

C. H. JENKINS.
WATCHMAN'S TIME REGISTER.
APPLICATION FILED JAN. 13, 1912.
1,135,529.
Patented Apr. 13, 1915.
2 SHEETS—SHEET 2.
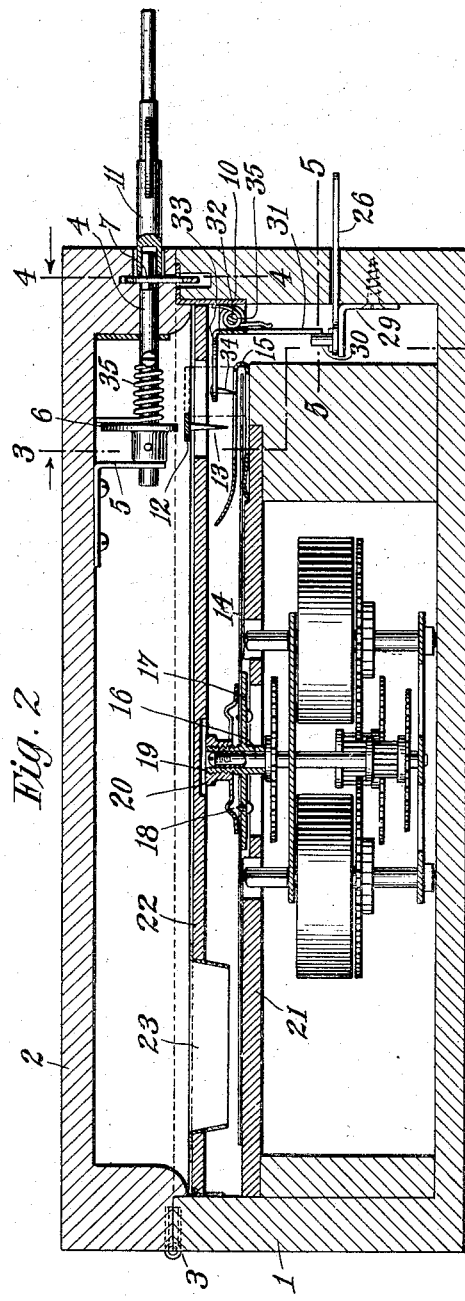
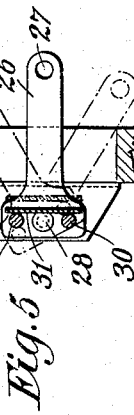
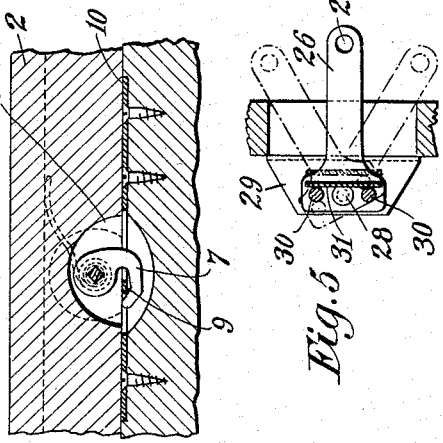
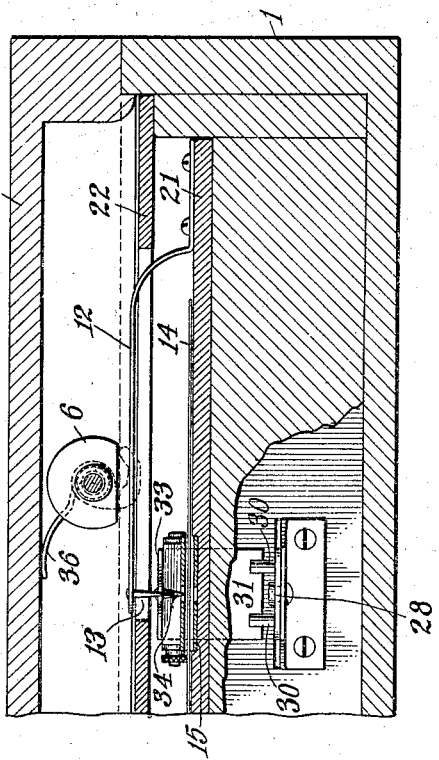
Witnesses:
Inventor
Chas. H. Jenkins
By his Attorney

UNITED STATES PATENT OFFICE.

CHARLES H. JENKINS, OF BELLEVILLE, NEW JERSEY, ASSIGNOR TO NEWMAN CLOCK CO., OF NEW YORK, N. Y., A CORPORATION OF NEW YORK.

WATCHMAN'S TIME-REGISTER.

1,135,529.           Specification of Letters Patent.       Patented Apr. 13, 1915.

Application filed January 13, 1912. Serial No. 671,138.

*To all whom it may concern:*

Be it known that I, CHARLES H. JENKINS, a citizen of the United States, residing at Belleville, county of Essex, and State of New Jersey, have invented certain new and useful Improvements in Watchmen's Time-Registers, of which the following is a full, clear, and exact description.

The invention, which forms the subject matter of this application, relates to a time register suitably placed in a building to indicate the time of arrival and departure of the employee or employees.

More specifically the device consists of a time register having a record sheet in the form of a disk of paper, graduated circumferentially by radial divisions corresponding to predetermined time intervals. In this particular case the dial may be divided into fourteen parts corresponding to the number of nights and days of each week. This is especially desirable in a seven day clock. Each part is subdivided into smaller divisions representing the hours of the day, and the hours may be further divided into smaller divisions corresponding to a certain number of minutes. This dial is operatively connected to the arbor of suitable clock mechanism in such manner that the two will rotate in unison, the dial thus making a complete rotation in one week. Recording devices are provided, arranged in fixed position relative to the rotating record dial and constructed to be actuated by suitable mechanism located adjacent thereto. The recording devices include a marking device, or devices, for example a die or a punch, adapted to make a die-mark or a perforation in the record dial at each operation of suitable mechanism connected thereto. The mark or perforation will then indicate the exact time at which the employee, if used for that specific purpose, operated the marking mechanism.

My invention relates more particularly to the mechanism for punching the record dial both to indicate the time of arrival and departure of employees and to indicate the time that the clock was opened to gain access to the clock mechanism or the record dial, thus preventing fraudulent marking of the same.

In the drawings wherein I show an embodiment of my invention, Figure 1 is a plan view of the time register with the door thereof swung back on its hinges and with parts broken away to show the record dial and the means for marking the same. Fig. 2 is a central section of the register in closed position taken on the line 2—2 of Fig. 1. Fig. 3 is a section on line 3—3 of Fig. 2. Fig. 4 is a section on the line 4—4 of Fig. 2. Fig. 5 is a section on line 5—5 of Fig. 2.

Referring to the drawings wherein like characters refer to the same parts in all the views, 1 designates the body of a time register having the closure 2 hinged thereto at 3. The closure 2 is normally locked to the body portion and this locking mechanism includes means to mark the record dial each time it is opened, for instance, to wind up the clock mechanism, and enables the employer or other person to ascertain immediately whether or not the same has been opened by unauthorized persons. This locking mechanism consists in a rock-shaft 4 journaled at one end in the downwardly projecting flange of the cover and at its other end in the angle plate 5. Upon the rock-shaft, adjacent the inner end thereof, is fixedly secured a cam 6, while at the other end is secured a locking member 7 operating in a slot 8 of the cover 2 and engaging with a corresponding member 9 on the metal strip 10 the latter being rigidly secured to the body portion of the clock and the body itself being mortised to receive the locking member 7. The locking member 7 is provided with a rectangular perforation through which the end of the shaft having a corresponding shape, is adapted to pass. Hence there is no necessity for securing the two rigidly together. The end of the shaft is so constructed that its movement to the right, in Fig. 1, is limited by the locking member 7, and its movement in the opposite direction is limited by engagement of the hub of the cam 6 with the angle piece 5. When the shaft 4 is rocked by means of the key or other suitable tool 11 to unlock the clock to gain access thereto, the cam 6 depresses the recording member 12, located immediately below it, and the needle 13 produces indelible record upon the dial 14 which will indicate the exact time thereon when the cover was unlocked.

At 15 is shown a U-shaped member between the arms of which the outer edge of the record dial is adapted to pass. Slits are provided in these arms to allow the needle of the recording means to pass therethrough. While the upper arm is unnecessary in making the puncture, it serves very admirably to shed the dial from the needle after the record or puncture is made therein.

Upon the arbor 16 of the clock mechanism is provided a record-dial supporting plate 17 through which pass suitable pointed mechanism 18 for engaging with the dial at a slight distance from the center of said plate. Projecting centrally and upwardly from this plate is an externally screw-threaded split sleeve 19 adapted to receive an internally screw-threaded member 20 which firmly clamps the record-dial to the record plate, and also causes a positive binding action between the split sleeve and the clock arbor to insure rotation of the record-dial plate in unison with the said arbor. This mechanism I do not claim as a part of this invention.

The major portion of the dial 14 is supported upon a member 21 perforated to receive a key therethrough to wind up the clock mechanism and also perforated to provide for the upwardly protruding portion of the arbor. The dial supporting plate 17 is set into the member 21 so that the upper edge of the supporting plate is flush with the upper edge of the member 21, (see Fig. 2).

At 22 I show an auxiliary closure, hinged to the clock casing, similar to the member 21, which is provided with slots 23 therein in case the record-dial is to be used autographically. In such a case each user is provided with a key for opening the cover, in event that the mechanism described above is used for recording purposes. The cover portion may be omitted however and the recording mechanism described below used to indicate the time of arrival and departure. The time of arrival and departure will be indicated by the recording mechanism and the name of the particular individual who operated the recording mechanism will be written on the dial at point which corresponds to the time when the inscription was made.

The time register, in use, will be secured to a vertical wall with the securing lug 24, 24 uppermost and the lugs 25, 25 lowermost. It is obvious that it will operate equally as well when reversed, but the arrangement suggested is perhaps the more convenient. Projecting from one side thereof is an arm 26 having a perforation 27 in which a card or other pull is secured. The arm is pivoted at 28 to a vertical flange 29 (see Fig. 5) and is provided on opposite sides of and in alinement with its pivotal point, with horizontal studs 30. These studs engage normally with one of the arms 31 of a substantially right-angular member pivoted at 32, and the other arm 33 of which carries a recording means 34. The pivot 32 is supported by ears projecting from plate 10 and is provided with a spring 35 (see Fig. 1) which tends to retract the recording means from the record-dial and to maintain the arm 31 in constant engagement with the studs 30. The recording means 34, like the recording means 13, passes through the slits in the U-shaped member 15 which likewise serves to shed the dial therefrom. From the preceding it will be apparent that either an upward or a downward vertical pull on the arm 26 will transmit a horizontal movement to the arm 33 and hence make a record upon the record plate. It is obvious from a perusal of Fig. 1 that although the record is not made on one of the smaller subdivisions at the outer edge, it will, in such event, be made in radial alinement therewith.

The particular arrangement of the mechanism just described is preferred. In having the arm 26 project from the side of the clock casing a direct upward or downward vertical pull thereon will impart a horizontal movement to the right-angular member 31—33.

A spiral spring 35 is mounted on the shaft 4 one end of which is directly secured to said shaft and the other end of which engages with the cover or closure 2. This spring tends normally to maintain the cam 6 and associated parts in the position shown in Figs. 2, 3 and 4.

From the foregoing it will be apparent that the device is very compact and possesses many capabilities. As ordinarily operated the closure is locked to the body portion and only those authorized to unlock the same are provided with a key for that purpose. In its ordinary use the closure is simply unlocked to remove and replace the record dial or for the purpose of rewinding the clock mechanism. Each time the closure is locked or unlocked the recording mechanism makes a record thereof. Hence in replacing a dial not only is the dial removed therefrom punched, but in locking the device after placing a new dial therein the latter is also punched, thus indicating the time when the old dial was removed and the time when the new dial was placed therein. These indications on these two dials should tally. However when the closure is unlocked merely for winding purposes only one indication will be recorded in the record dial, unless perhaps the closure is kept open for a time sufficient to allow the dial to move an appreciable amount from the position it assumed at the time of unlocking the closure. In this case the time when the closure was again locked will be indicated, and from these indications it can be readily calculated just how long the closure was kept open. Of course the auxiliary closure 22 upon removing and replacing the record-dials, and in winding the clock mechanism, will be turned upon its hinges in order to gain access to those parts. As before stated when it is desired to use the autographic arrangement each individual may be provided with a key for unlocking the cover and making the inscription thereon. But suppose it is desired to use the simpler method of pulling lever 26 to make the indication; in this case the main closure is omitted entirely. In this case the auxiliary closure is locked in closed position by means, for example, a key operated lock as shown in the lower right hand corner of Fig. 1. This is necessary as otherwise the auxiliary closure could be raised, fugitive marks made and the record thereby rendered nugatory.

It is obvious that the device is not limited to the specific uses mentioned herein, but on the contrary is especially adapted for general application. The specific form of dial mentioned herein is only one of a large variety that can be used, and it is very likely that each owner will want a dial suitable for his particular purpose. The punching means for indication is also a suggestion rather than a limitation as other recording indicia may be resorted to. In other words it is quite obvious that the mechanism described herein and shown in the accompanying drawings is simply an expression of the preferred embodiment of the invention.

It is obvious that the principles of the invention are capable of various embodiments and it is to be understood that I do not limit myself to the construction shown as other constructions may be resorted to without in any way deviating from the true spirit and scope of my invention.

What I claim is:—

1. A time register comprising, in combination, a clock casing, a closure therefor, a record dial and recording means in said casing, a rock shaft secured in the inside of said closure and extending longitudinally thereof, a cam secured upon the rock shaft and adapted to engage with the said recording means to cause the latter to make an impression upon the dial when the rock shaft is actuated in the operation of unlocking the closure and means on the rock shaft adapted to engage with the closure to secure the closure and cover in locked position.

2. A time register comprising, in combination, a clock casing, a closure secured to the said casing, a recording dial, recording means in said casing, a rock shaft secured in the inside of said closure and extending longitudinally thereof, a cam secured upon the said rock shaft near the inner end thereof and adapted to actuate said recording means when the rock shaft is rotated during the operation of unlocking the said closure, and means on the rock shaft near its outer end to engage with means upon the closure whereby to lock the said closure and cover.

3. A time register comprising, in combination, a clock casing, a closure secured to the said casing, a record dial, recording means in said casing, a rock shaft secured to the inside of said closure and extending longitudinally thereof, a cam secured upon the said rock shaft near the inner end thereof and adapted to actuate said recording means when the rock shaft is rotated during the operation of locking the said closure, and means on the rock shaft near its outer end to engage with means upon the closure whereby to lock the said closure and cover.

4. A time register comprising, in combination, a clock casing, a closure therefor, a record dial and recording means in said casing, a rock shaft secured in said closure and extending longitudinally thereof, a cam secured to said rock shaft and adapted to engage with the said recording means to cause the same to make an impression upon the dial when the rock shaft is actuated to lock or unlock the casing, a spring upon said rock shaft adapted to hold the cam out of contact with the recording means when the casing is in locked or unlocked positions and means on the rock shaft adapted to engage with means upon the closure whereby to lock the said closure and cover.

5. A time register comprising, in combination, a clock casing, a closure therefor, a record dial in said casing, a member pivotally secured to the said casing comprising oppositely extending arms, one of which extends inwardly over the dial and the other downwardly, a recording member upon the inwardly extending arm, a member pivotally mounted in the casing and extending outwardly through the same, against which the downwardly extending arm abuts, and upwardly extending lugs upon the said pivotal member adapted to engage with the said downwardly extending arm when the pivotal arm is actuated whereby the recording means is actuated to make an impression upon the dial.

6. A time register comprising, in combination, a clock casing, a closure therefor, a record dial in said casing, a member pivotally secured to the said casing comprising oppositely extending arms, one of which extends inwardly over the dial and the other downwardly, a spring coöperating with the said armed member adapted to hold the recording means normally out of contact with the dial, a member pivotally mounted in the casing and extending outwardly through the same against which the downwardly extending arm abuts and upwardly extending lugs upon the said pivotal member adapted to engage with the said downwardly extending arm when the pivotal arm is actuated whereby the recording means is actuated to make an impression upon the dial.

In testimony whereof I affix my signature in the presence of two subscribing witnesses.

CHARLES H. JENKINS.

Witnesses:
WM. BOHLEBER,
M. LAMSON DYER.